H. A. HARVEY.
Nut and Bolt Lock.

No. 197,467. Patented Nov. 27, 1877.

UNITED STATES PATENT OFFICE.

HAYWARD A. HARVEY, OF ORANGE, NEW JERSEY.

IMPROVEMENT IN NUT AND BOLT LOCKS.

Specification forming part of Letters Patent No. 197,467, dated November 27, 1877; application filed June 4, 1877.

*To all whom it may concern:*

Be it known that I, HAYWARD A. HARVEY, of Orange, New Jersey, have invented an Improvement in Screw Bolts and Nuts, of which the following is a specification:

My improvement relates to that class of screw-bolts in which the nut is intended to be held in the position in which it is applied by the upsetting of the screw-threads. Heretofore this has been accomplished by jamming the nut hard against the object through which the bolt passed, the bolt-thread having been constructed of suitable form to yield in the required direction.

In my present invention I provide for the upsetting of the threads by the action of the nut upon the bolt without requiring the presence of any intervening object between the head of the bolt and the nut; and my invention consists in forming the bolt-thread with a differential or varying pitch, and the nut-thread with a uniform pitch, or vice versa; or I may form both the bolt-thread and the nut-thread, respectively, with varying pitches, which differ from each other.

The accompanying drawings illustrate my invention as exhibited in a bolt the thread of which increases in pitch from the point toward the head, while the nut has a thread of uniform pitch. In this case the pitch of the threads, respectively, is so proportioned that a nut can be easily started on the end of the bolt, and will turn freely for about two and a half revolutions, at which point the interference of the threads causes such friction that the nut cannot be further turned without the application of power sufficient to upset the threads upon each other. The extent of this upsetting of the threads depends upon the number of turns which are thus forcibly given to the nut.

The bolt is constructed with reference to use in objects of ascertained thickness, and the differential threads are proportioned with reference to being made to acquire the desired degree of upsetting when the nut has brought up against the surface of the object through which the bolt is inserted.

The effect of upsetting the thread in this way is not only to make the nut hold its position with a strong gripe, but to render the nut incapable of being unscrewed from the bolt without the application of sufficient force to set its threads back somewhat to accommodate them to the finer pitch of the thread near the end of the bolt.

Figure 1:
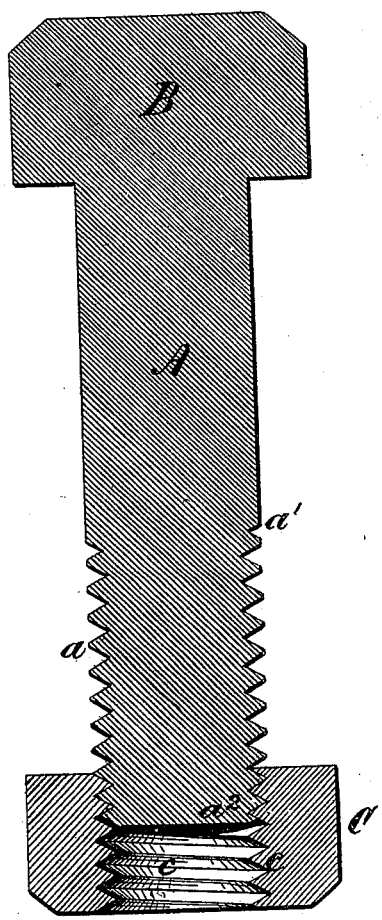
Figure 2:
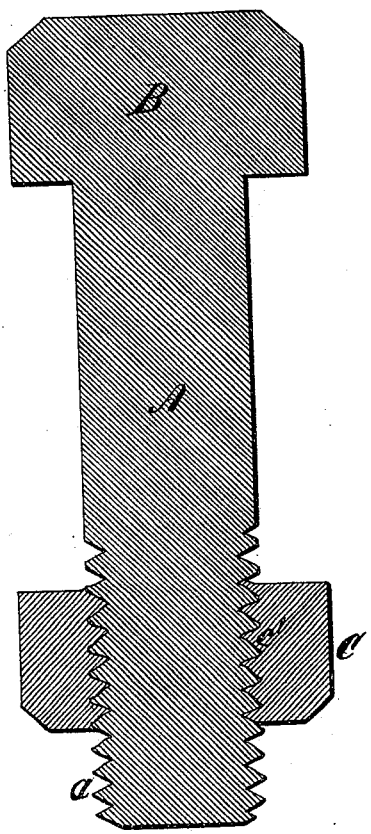

In the drawings, Figure 1 represents a central longitudinal section of my bolt, showing the differential thread in its normal position, and showing the nut started on the end of the bolt to the point where the nut-thread binds on the bolt-thread; and Fig. 2 represents the nut in its final position, and shows the character of the modification in the form of the nut-thread due to the forcible driving of the nut upon the coarser part of the bolt-thread.

In the drawings, A represents the shank of the bolt; B, the head, and C the nut. The bolt-thread $a$ is an ordinary V-thread, and has a pitch gradually diminishing from its point of commencement $a^1$ to the end $a^2$ of the bolt.

The nut-thread is shown in its original form at $c$ in Fig. 1, and in a modified form at $c'$ in Fig. 2.

It will, of course, be understood that the form of the thread may be varied without departing from my invention, if the described differences in pitch are preserved.

I claim as my invention—

The combination, with each other, of a bolt and a nut, one or both of which has a screw-thread of differential or varying pitch, as and for the purpose set forth.

H. A. HARVEY.

Witnesses:
ASA FARR,
EDWD. PAYSON.